United States Patent
Yang

(10) Patent No.: US 11,294,444 B2
(45) Date of Patent: Apr. 5, 2022

(54) ACTUAL OR APPARENT POWER FAILURE DETECTING SYSTEM AND METHOD

(71) Applicant: HONGFUJIN PRECISION ELECTRONICS(TIANJIN)CO., LTD., Tianjin (CN)

(72) Inventor: Rui Yang, Tianjin (CN)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 259 days.

(21) Appl. No.: 16/535,224

(22) Filed: Aug. 8, 2019

(65) Prior Publication Data

US 2021/0034131 A1 Feb. 4, 2021

(30) Foreign Application Priority Data

Jul. 29, 2019 (CN) .......................... 201910690751.3

(51) Int. Cl.
  *G06F 1/30* (2006.01)
  *G06F 11/20* (2006.01)
  *G06F 1/26* (2006.01)

(52) U.S. Cl.
  CPC ............ *G06F 1/30* (2013.01); *G06F 11/2015* (2013.01)

(58) Field of Classification Search
  CPC .......... G06F 1/30; G06F 11/2015; G06F 1/26; G06F 1/28; G06F 11/305; G06F 511/3476

USPC .......................................................... 713/300
  See application file for complete search history.

(56) References Cited

U.S. PATENT DOCUMENTS

| | | | | |
|---|---|---|---|---|
| 4,188,663 A | * | 2/1980 | Okawa | H02H 3/24 363/37 |
| 6,104,215 A | * | 8/2000 | Schindler | G01R 19/16557 327/217 |
| 2006/0006701 A1 | * | 1/2006 | Wells | B60J 7/0573 296/223 |
| 2019/0317875 A1 | * | 10/2019 | Liu | G06F 11/0787 |

* cited by examiner

*Primary Examiner* — Michael J Brown
(74) *Attorney, Agent, or Firm* — ScienBiziP, P.C.

(57) ABSTRACT

A system for distinguishing between actual power failure and false power failure in relation to a system under Efuse control includes a power unit, a detection unit, a control unit, a management substrate, and a management unit. The power unit outputs a voltage to the detection unit and the control unit. The detection unit detects state of a power supply from the power unit, and outputs a signal to the control unit. The management substrate monitors an operating state of the power unit, and outputs a status signal. The management unit obtains a system interrupt instruction from the control unit, and generates an error event or does not generate an error event according to the system interrupt instruction and a small period of time for establishing an actual or a false abnormality. A method for detecting an apparent or an actual power failure is also provided.

19 Claims, 2 Drawing Sheets

ACTUAL OR APPARENT POWER FAILURE DETECTING SYSTEM AND METHOD

FIELD

The subject matter herein generally relates to detecting power failures.

BACKGROUND

When the supply voltage to an electronic device drops during system operation for some reason (such as overload), the complex programmable logic device (CPLD) detects an Efuse operation failure and reports an error message to the baseboard management controller (BMC). At this point of an Efuse runtime failure, the user needs to arrange the engineer to debug the cause of the failure on the server. When an AC power failure occurs during system operation, the CPLD detects the power supply voltage fault in real time, and the CPLD reports the fault to the BMC, and prompts the user for the error caused by the server being shut down. However, this is not an actual operation failure by the Efuse and no debugging is required. But the user will still assign the engineer to debug this failure, which will increase the operating cost of the server.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
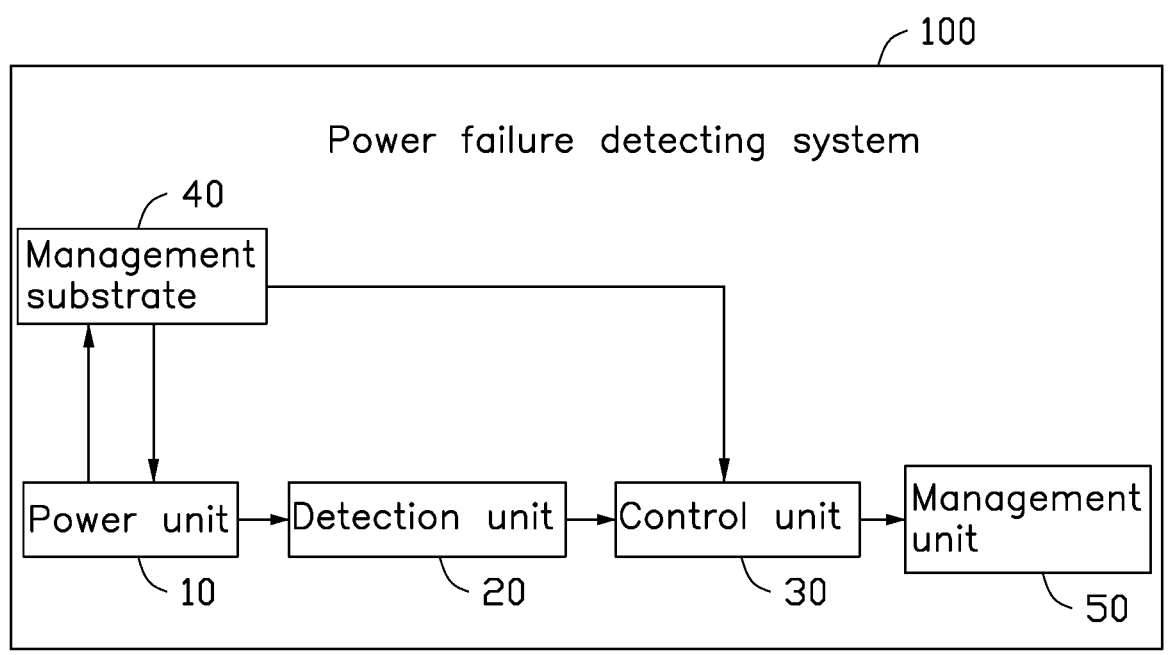
FIG. 1 is a schematic diagram of an embodiment of a power failure detecting system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a system for detecting power failure 100 in accordance with an embodiment of the present disclosure.

The power failure detecting system 100 can operate in an electronic device (not shown). In an embodiment, the power failure detecting system 100 operates in a server (not shown).

The power failure detecting system 100 includes a power unit 10, a detection unit 20, a control unit 30, a management substrate 40, and a management unit 50. In an embodiment, the detection unit 20, the control unit 30, and the management unit 50 are disposed on a motherboard (not shown) of the electronic device.

In an embodiment, the power unit 10 is electrically coupled to the management substrate 40, and the detection unit 20 is electrically coupled between the control unit 30 and the power unit 10. The management substrate 40 is electrically coupled to the control unit 30, and the control unit 30 is electrically coupled to the management unit 50.

In an embodiment, the control unit 30 can be a complex programmable logic device (CPLD). In other embodiments, the control unit 30 can be a field programmable gate array (FPGA).

In an embodiment, the management unit 50 can be a baseboard management controller (BMC).

When the electronic device (such as a server) is powered on, the power unit 10 outputs a voltage to and through the detection unit 20 and the control unit 30, to supply power to the detection unit 20 and the control unit 30.

The detection unit 20 detects a power supply of the power unit 10, and outputs a detection signal to the control unit 30 according to the power supply of the power supply unit 10.

When the power unit 10 is normally powered, the power unit 10 outputs a first voltage (such as a DC voltage of 12V) to the detection unit 20, and the detection unit 20 outputs the detection signal at a high level to the control unit 30 to signal that the power unit 10 is normally powered.

When the power unit 10 is abnormally powered, the first voltage output by the power unit 10 will continuously decrease, the detection unit 20 outputs the detection signal at a low level to the control unit 30 to signal that the power unit 10 is abnormally powered.

In an embodiment, the management substrate 40 is configured to monitor an operating state of the power unit 10, and output a status signal to the control unit 30 according to an operating state of the power unit 10.

When the power unit 10 has a power failure (such as an overload), the management substrate 40 will output a continuous signal at a high level to the control unit 30.

When the power unit 10 is disconnected from power source, the status signal outputted by the management substrate 40 will be switched from a high level to a low level within a preset time (such as 200 ms).

When the detection signal is at the low level, the control unit 30 determines whether the status signal is maintained in the high level within a preset time (such as 200 ms).

If the status signal is maintained in the high level within 200 ms, the control unit 30 will send a system interrupt instruction to the management unit 50, and the management unit 50 will generate an error event according to the system interrupt instruction.

In an embodiment, the error event is used to record error information generated by the power unit 10 during abnormal operation, and the error information may include time, reason for error, and the like.

In an embodiment, the management unit 50 also transmits the error event to a user interface (UI). Therefore, the user can view the error event through the UI and perform debugging accordingly.

If the status signal is switched from the high level to the low level within 200 ms, the control unit 30 will not send the system interrupt instruction to the management unit 50, and the management unit 50 will not generate the error event. Therefore, it can avoid the need to allocate manpower to debug faults in the event of a false failure, thereby reducing the operating cost of the server and improving the user experience.

Figure 2:
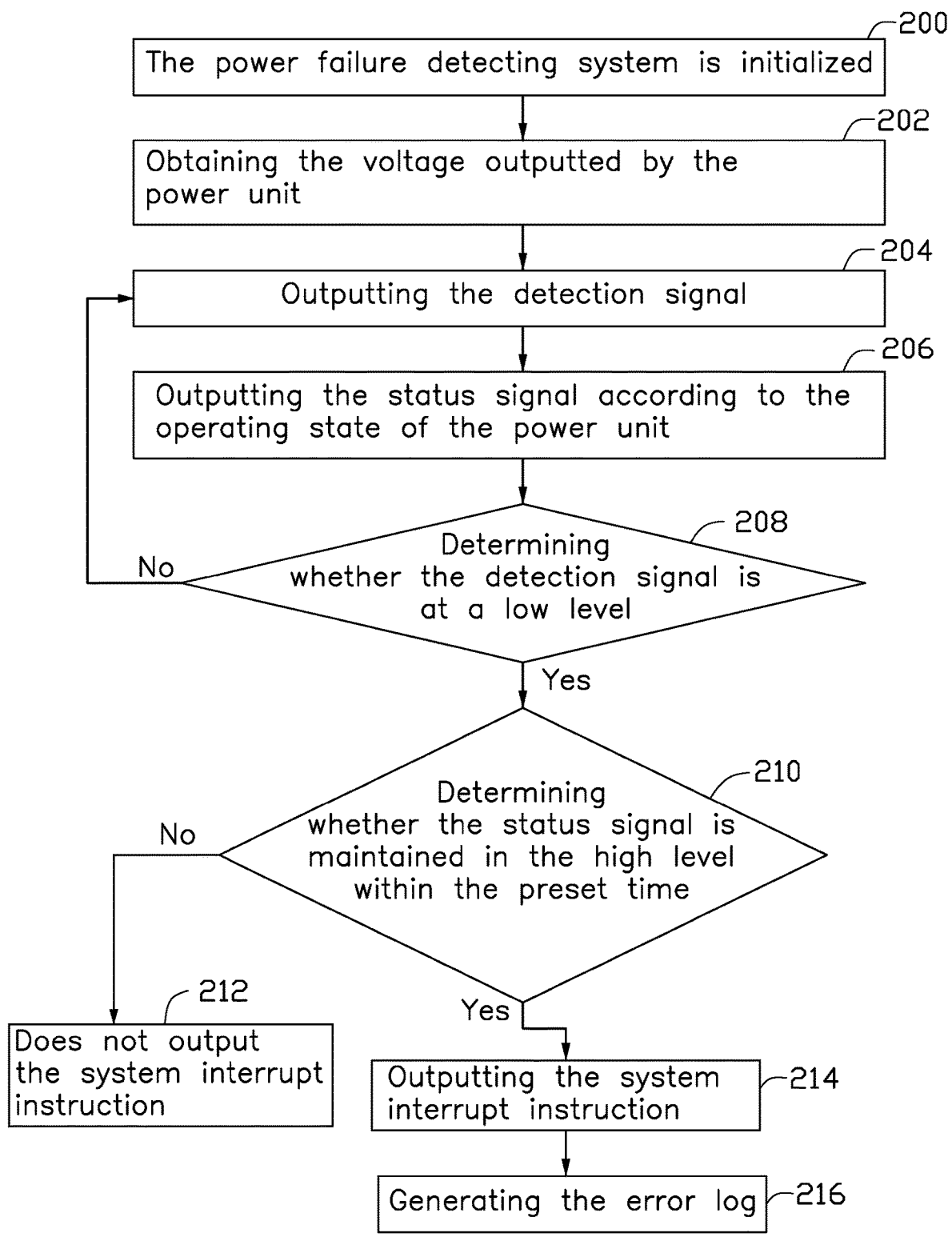
FIG. 2 is a flow diagram of an embodiment of a method for detecting power failure in the system of FIG. 1.

FIG. 2 is a flowchart depicting an embodiment of a power failure detecting method. The method is provided by way of example, as there are a variety of ways to carry out the method. The method described below can be carried out using the configurations illustrated in FIG. 1 for example, and various elements of these figures are referenced in explaining the example method. Each block shown in FIG. 2 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 200.

At block 200, the power failure detecting system 100 is initialized.

At block 202, the detection unit 20 obtains the voltage from the power unit 10.

In an embodiment, when the electronic device is powered on, the power unit 10 outputs the voltage and through to the detection unit 20 and the control unit 30, to supply power to the detection unit 20 and the control unit 30.

At block 204, the detection unit 20 receives the voltage, and outputs the detection signal to the control unit 30.

In an embodiment, When the detection unit 20 detects the first voltage (such as the DC voltage of 12V) outputted by the power unit 10, the detection unit 20 outputs the detection signal at a high level to the control unit 30. When the detection unit 20 detects the first voltage outputted by the power unit 10 is continuously decreased, the detection unit 20 outputs the detection signal at a low level to the control unit 30.

At block 206, the management substrate 40 monitors the operating state of the power unit 10, and outputs the status signal to the control unit 30.

When the power unit 10 has a power failure (such as an overload), the management substrate 40 will continuously output the status signal at a high level to the control unit 30.

When the power unit 10 is disconnected from power source, the status signal outputted by the management substrate 40 will be switched from a high level to a low level within a preset time (such as 200 ms).

At block 208, the control unit 30 determines whether the detection signal is at a low level. If the detection signal is at a low level, block 210 is implemented, otherwise returns to block 204.

At block 210, the control unit 30 determines whether the status signal is maintained in the high level within a preset time (such as 200 ms). If the status signal is maintained in the high level within the preset time, block 214 is implemented, otherwise block 212 is implemented.

At block 212, the control unit 30 does not output the system interrupt instruction to the management unit 50.

When the status signal is switched from the high level to the low level within 200 ms, the control unit 30 will not send the system interrupt instruction to the management unit 50, and the management unit 50 will not generate the error event. Therefore, it can avoid the need to allocate manpower to debug faults in the event of a false failure, thereby reducing the operating cost of the server and improving the user experience.

At block 214, the control unit 30 outputs the system interrupt instruction to the management unit 50.

when the status signal is maintained in the high level within 200 ms, the control unit 30 will send a system interrupt instruction to the management unit 50.

At block 216, the management unit 50 generates the error event.

In an embodiment, the error event is used to record error information generated by the power unit 10 during abnormal operation, and the error information may include time, reason for error, and the like.

In an embodiment, the management unit 50 also transmits the error event to a user interface (UI). Therefore, the user can view the error log through the UI and perform debugging accordingly.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A power failure detecting system comprising:
a power unit outputting a voltage;
a detection unit coupling to the power unit and obtaining the voltage; wherein the detection unit outputs a detection signal;
a management substrate coupling to the power unit; wherein the management substrate monitors an operating state of the power unit, and outputs a status signal;
a control unit coupling to the detection unit and the management substrate, and obtaining the detection signal and the status signal;
wherein when the detection signal is at a low level, the control unit determines whether the status signal is maintained in a high level within a preset time;
wherein when the status signal is maintained in the high level within the preset time, the control unit outputs system interrupt instruction; and when the status signal is switched from the high level to the low level within the preset time, the control unit does not output the system interrupt instruction.

2. The power failure detecting system of claim 1, wherein the power failure detecting system further comprises a management unit, and the management unit is electrically coupled to the control unit, and the management unit obtains the system interrupt instruction; the error event is used to record error information generated by the power unit during abnormal operation, and the error information comprises time and reason for error.

3. The power failure detecting system of claim 2, wherein the management unit generates an error event according to the system interrupt instruction.

4. The power failure detecting system of claim 3, wherein the error event records error information generated by the power unit during abnormal operation, and the error information comprises error time and reason for error.

5. The power failure detecting system of claim 2, wherein the management unit is a baseboard management controller (BMC).

6. The power failure detecting system of claim 1, wherein the control unit is a complex programmable logic device (CPLD).

7. The power failure detecting system of claim 1, wherein the control unit is a field programmable gate array (FPGA).

8. The power failure detecting system of claim 1, wherein the preset time is 200 ms.

9. A power failure detecting system comprising:
a power unit outputting a voltage;
a detection unit coupling to the power unit and obtaining the voltage; wherein the detection unit outputs a detection signal;
a management substrate coupling to the power unit; wherein the management substrate monitors an operating state of the power unit, and outputs a status signal;
a control unit coupling to the detection unit and the management substrate, and obtaining the detection signal and the status signal; wherein when the detection signal is at a low level, the control unit determines whether the status signal is maintained in a high level within a preset time; wherein when the status signal is maintained in the high level within the preset time, the control unit outputs system interrupt instruction; and when the status signal is switched from the high level to the low level within the preset time, the control unit does not output the system interrupt instruction; and
a management unit coupling to the control unit and obtaining the system interrupt instruction; wherein the management unit generates an error event according to the system interrupt instruction.

10. The power failure detecting system of claim 9, wherein the control unit is a complex programmable logic device (CPLD), wherein the error event is used to record error information generated by the power unit during abnormal operation, and the error information comprises time and reason for error.

11. The power failure detecting system of claim 9, wherein the control unit is a field programmable gate array (FPGA).

12. The power failure detecting system of claim 9, wherein the preset time is 200 ms.

13. The power failure detecting system of claim 9, wherein the error event records error information generated by the power unit during abnormal operation.

14. The power failure detecting system of claim 13, wherein the error information comprises error time and reason for error.

15. The power failure detecting system of claim 9, wherein the management unit is baseboard management controller (BMC).

16. A power failure detecting method, comprising:
outputting a voltage outputted by a power unit;
obtaining the voltage and outputting a detection signal;
detecting an operating state of the power unit and outputting a status signal;
determining whether the status signal is maintained in a high level within a preset time when the detection signal is at a low level;
outputting system interrupt instruction when the status signal is maintained in the high level within the preset time; and
generating an error event according to the system interrupt instruction.

17. The power failure detecting method of claim 16, wherein the preset time is 200 ms; wherein the error event is used to record error information generated by a power unit during abnormal operation, and the error information comprises time and reason for error.

18. The power failure detecting method of claim 16, wherein the error event records error information generated by the power unit during abnormal operation.

19. The power failure detecting method of claim 18, wherein the error information comprises error time and reason for error.

* * * * *